Figure 1:
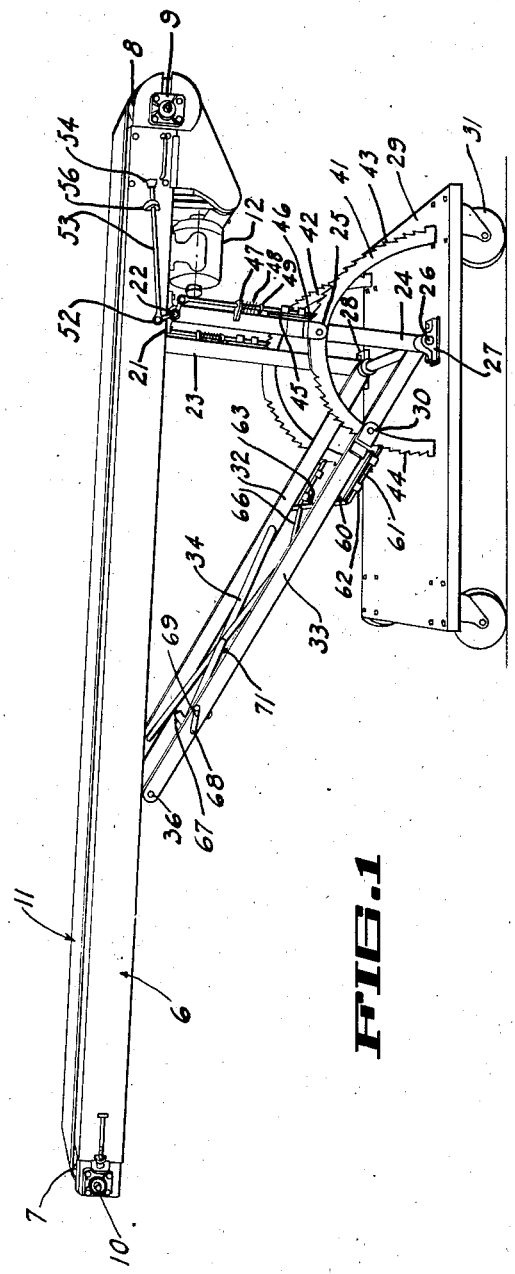

Aug. 19, 1947.   R. A. BRADY   2,425,860
CONVEYOR
Filed Sept. 22, 1945   2 Sheets-Sheet 1

INVENTOR.
RAYMOND A BRADY
BY
ATTORNEY

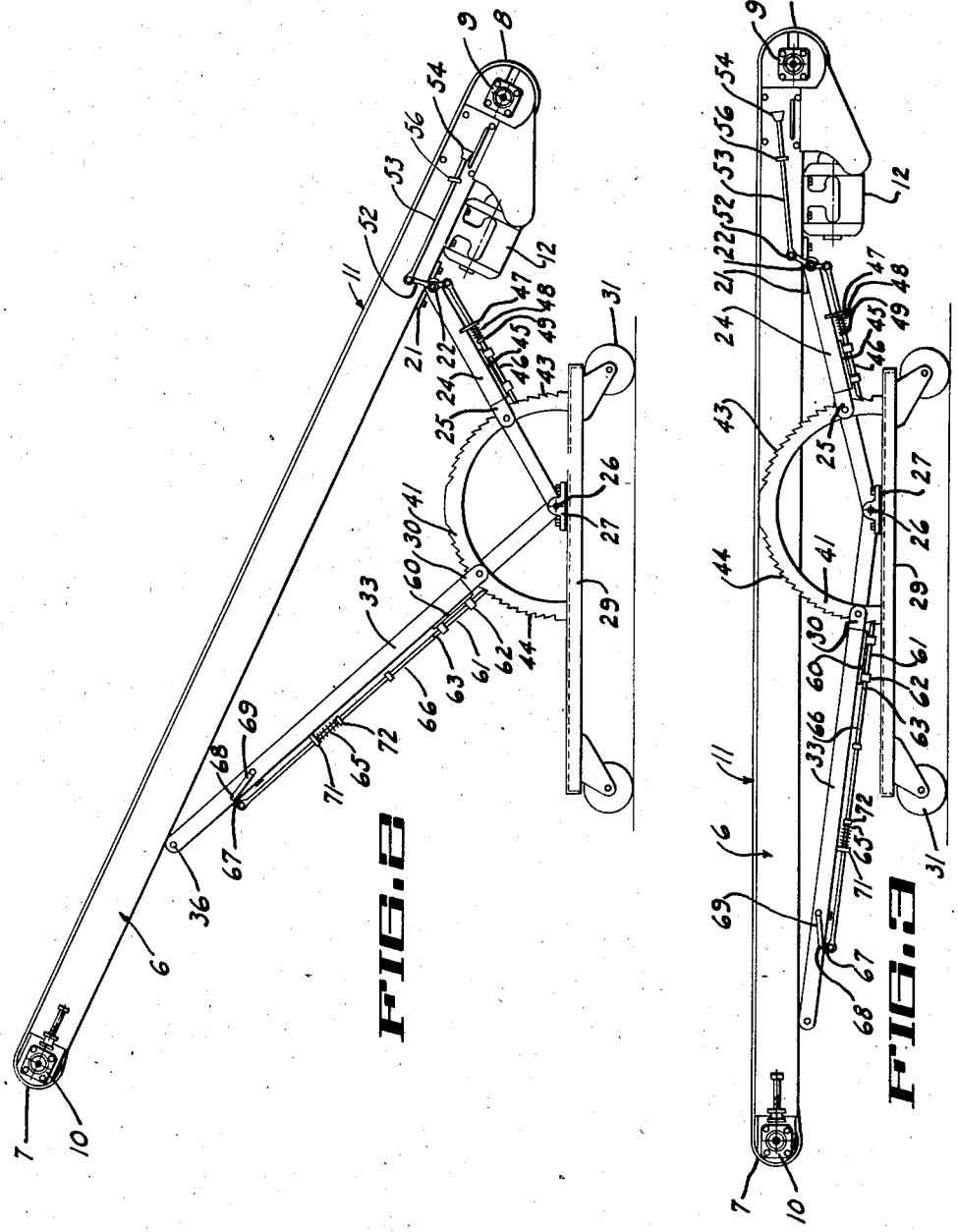

Patented Aug. 19, 1947

2,425,860

UNITED STATES PATENT OFFICE 2,425,860

CONVEYOR

Raymond A. Brady, San Francisco, Calif.

Application September 22, 1945, Serial No. 617,941

2 Claims. (Cl. 198—121)

This invention relates to improvements in conveyors, and particularly to a conveyor construction including a belt conveyor which can be positioned at various angles of inclination as well as at various horizontal elevations. Because of its flexibility in adjustment, the device may be applied to a wide variety of uses. As a horizontal conveyor, it can be employed as a feeder conveyor or as an individual unit to reach from one fixed position to another as a connecting link between other conveyors. In addition, the device can be used for piling or one or more of the conveyors can be placed in line with a fixed conveyor to provide a continuous line to reach a remote storage space.

It is in general the broad object of the present invention to provide a conveyor construction which can be adjusted to any position of inclination, can be used for the raising or lowering of goods or can be used in various horizontal positions.

To enable those skilled in the art to construct a conveyor embodying the present invention, the following detailed description of the present preferred form of structure is set forth.

Referring to the drawings forming a part hereof, Figure 1 is a perspective view taken from the side of a conveyor embodying the construction of the present invention.

Figure 2 and Figure 3 are each side elevations showing the device in various positions of adjustment.

Referring to the drawing, the conveyor includes a belt conveyor frame generally indicated at 6 and including rollers 7 and 8 mounted respectively at each end of the frame in suitable bearings 9 and 10. About the rollers is trained a suitable belt conveyor indicated generally by numeral 11. This can be made of any suitable material and can be of any desired width; it can include slats or other conveyor assisting devices. Roller 8 is usually driven and I have indicated an electric motor 12 as mounted upon one end of frame 6 and adapted to rotate roller 8 by a drive connection which is not shown. As is well known in the art, the motor may drive the belt 11 in either direction. In place of using an electric motor, one can use a gas engine or other suitable source of power for moving belt 11.

A pair of brackets 21 are mounted upon each side of the frame 6 adjacent the right-hand end thereof (Figure 1). A shaft 22 extends between the brackets and provides a hinge support for one end of each of a pair of supporting arms 23 and 24. The other ends of arms 23 and 24 are supported upon a shaft 26 carried in brackets 27 and 28 mounted upon a base 29. Preferably base 29 is mounted upon suitable caster devices 31 so that the base can be moved into a desired position on the ground support.

Also mounted upon shaft 26 are a pair of forwardly extending arms 32 and 33 (Figure 1) joined together by cross bracing 34 and carrying at their forward ends a cross shaft 36 which rides along and supports the under side of frame 6.

Means are provided for selectively retaining the arm pairs 23—24 and 32—33 in a desired position of adjustment. In the drawings I have illustrated this means as including semi-circular plates or arcuate segments 41 and 42 mounted upon base 29 in such relation to the center of shaft 26 that the outer peripheral edge of each segment corresponds to an arc struck about the center of shaft 26 as a center. Ears 25 and 30 are respectively provided on arms 23—24 and 32—33 to retain the arms in position and provide lateral stability.

Means are provided for selectively engaging each arm pair with segments 41 and 42 in a desired position of adjustment. In the form shown in the drawings, I have provided each segment 41 and 42 with sets of teeth 43 and 44 in which, in the case of arms 23 and 24, a movable pawl 46 is engaged. Each pawl is mounted slidably on a plate 45 and in a bracket 47 positioned on the side of each arm, a spring 48 being positioned between a stop 49 on the pawl and the bracket. The other end of the pawl is engaged with a bell crank 52 mounted on shaft 22. A rod 53 having a handle 54 is engaged with the other end of the bell crank 52 and is supported by bracket 56 adjacent to the right-hand end of conveyor frame 6. Upon pushing each handle 54 to the left in Figure 1, the bell crank is rocked counter clockwise and the pawl released; then the right-hand end of the conveyor frame 6 can be adjusted in position, arms 23—24 rotating freely on shaft 26.

The other pair of arms 33 and 34 likewise carry pawls 61 slidably mounted in guides 62 on plates 60 provided upon each of the arms and biased by a spring 65 positioned between a bracket 71 and a stop 72 to engage the teeth of 44 formed upon the cooperatively positioned portions of the segments 41 and 42. The pawls are joined together by a cross rod 63 from which a yoke 66 extends to a lever 67 mounted upon a shaft 68. An operating lever 69 is provided upon a shaft 68 so that an operator can rock the shaft and release the pawls against the spring bias and so adjust the position of arms 32 and 33.

In use, by adjusting the relative positions of the arm pairs, the conveyor frame 6 can be positioned in various positions of adjustment with respect to base 29. By releasing pawl 46, arm pairs 23 and 24 can be moved and the driving end of the conveyor elevated or the arm pairs can be so adjusted that the driving end of the conveyor is down, as appears in Figure 2. With the conveyor moving from the right to the left in Figure 1, another conveyor positioned closely adjacent to the right-hand end of the belt 11 in Figure 1 will result in the conveyor belt picking up articles discharged upon it and carrying the articles along to the left-hand side of Figure 1. By suitable adjustment of the arm pairs, the conveyor can be positioned horizontally at various elevations above the ground support (Figure 3).

I claim:

1. A conveyor structure comprising a frame, a continuous conveyor belt movable about said frame, means on said frame for moving said conveyor belt; a horizontal base, a first pair of arms hinged on said base on opposite sides thereof and engaged with said frame in a pivoted supporting relationship, a second pair of arms hinged on said base on a common hinge with first arms and on opposite sides of said base and engaged with said frame in a supporting relationship, and means for locking each arm pair in a desired position of adjustment comprising a pair of quadrants mounted on each side of said base cooperatively adjacent said arms, at least one of said quadrants having notches thereon, and locking means for engaging said notches selectively for locking said arms to at least one of said quadrants.

2. A conveyor structure comprising a frame, a continuous conveyor belt movable about said frame, means on said frame for moving said conveyor belt; a horizontal base, a first pair of arms hinged on said base on opposite sides thereof and engaged with said frame in a pivoted supporting relationship, a second pair of arms hinged on said base on a common hinge with first arms and on opposite sides of said base and engaged with said frame in a supporting relationship; and means for locking each arm pair in a desired position of adjustment comprising a pair of quadrants mounted on each side of said base and extending radially about said common hinge, each of said quadrants having a plurality of notches in its outer radial face, a pawl slidably mounted on each arm and movable into and out of a locking engagement with the notches in the associated quadrant, a common means for sliding simultaneously the pawls on the first pair of arms, and a second common means for sliding simultaneously the pawls on the second pair of arms.

RAYMOND A. BRADY.

REFERENCES CITED

The following references are of record in the file of this patent:

UNITED STATES PATENTS

| Number | Name | Date |
|---|---|---|
| 284,234 | Reeves | Sept. 4, 1883 |
| 390,016 | Gilmore | Sept. 25, 1888 |
| 956,816 | Mogg et al. | May 3, 1910 |
| 1,808,237 | Liggett | June 2, 1931 |